Figure 1:
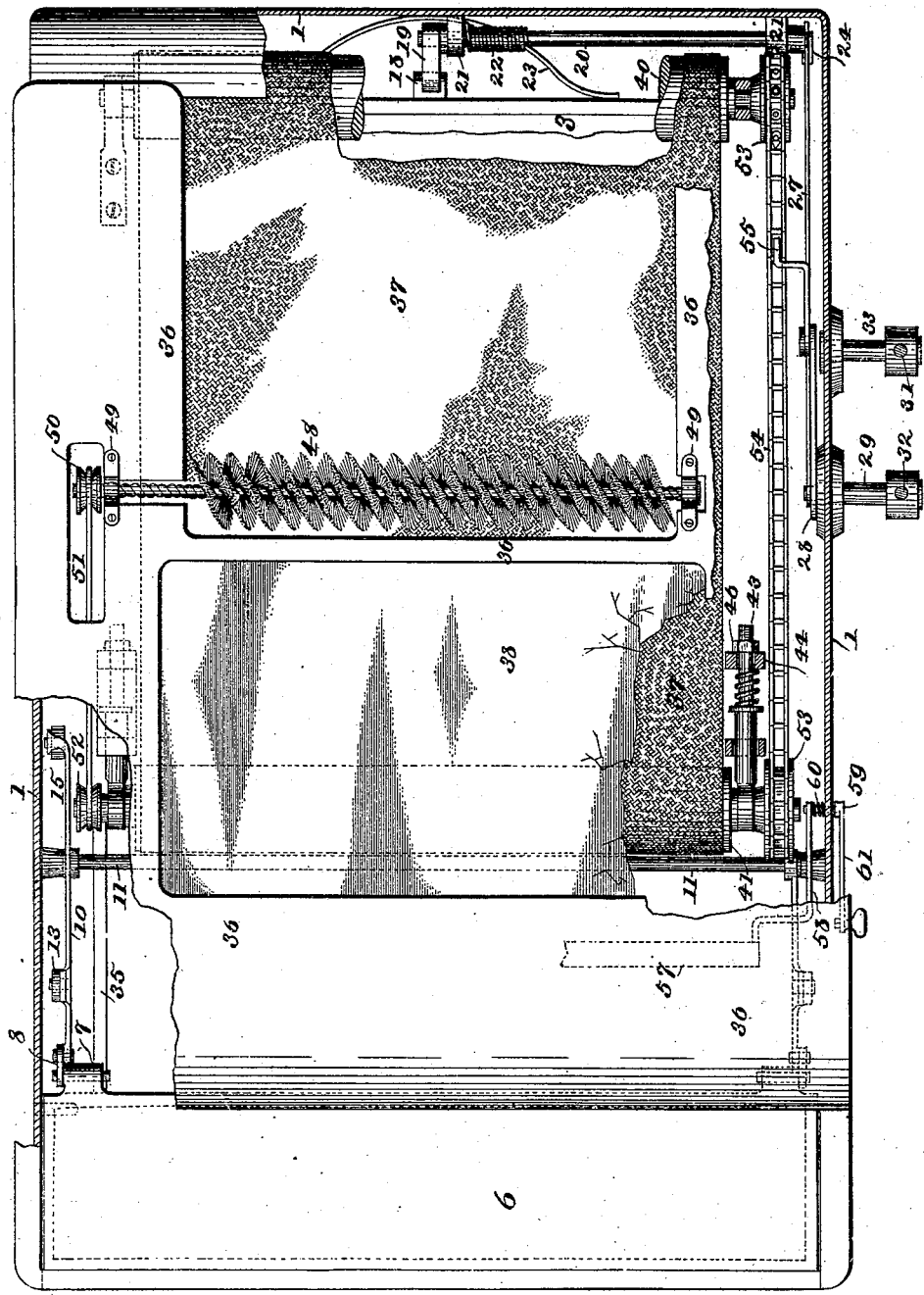

(No Model.)

T. F. RUSSEL & J. BRADY.
CASH CONTROLLING MACHINE.

No. 501,962. Patented July 25, 1893.

5 Sheets—Sheet 1.

WITNESSES:
John Buckler,
Robt. F. Gaylord

INVENTORS
Thurbur F. Russel
and James Brady
BY
Duncan & Page
ATTORNEYS (No Model.)
T. F. RUSSEL & J. BRADY.
CASH CONTROLLING MACHINE.
No. 501,962. Patented July 25, 1893.
5 Sheets—Sheet 2.
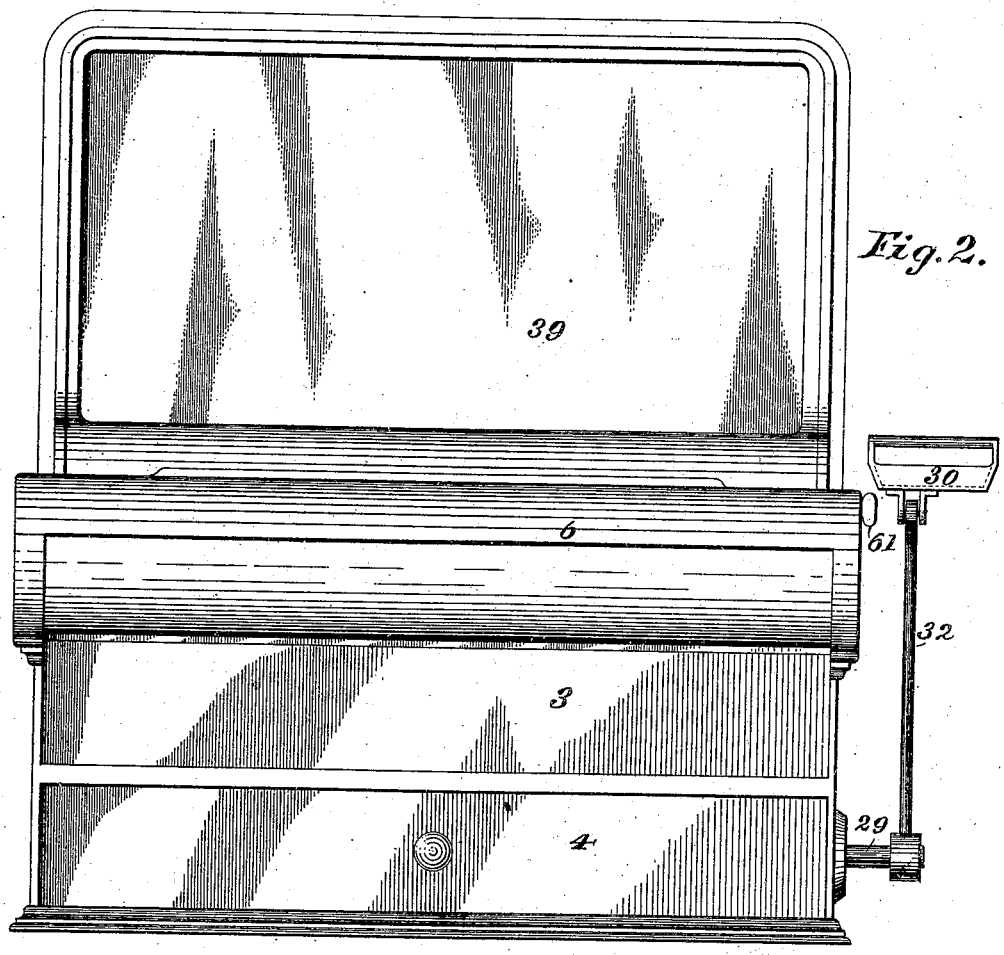
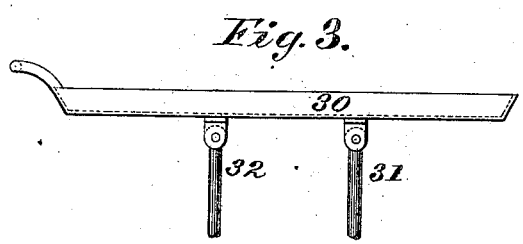
WITNESSES:
John Buckler,
Robt. F. Gaylord
INVENTORS:
Thurbur F. Russel
and James Brady
BY
Duncan & Page
ATTORNEYS (No Model.) 5 Sheets—Sheet 3.
T. F. RUSSEL & J. BRADY.
CASH CONTROLLING MACHINE.
No. 501,962. Patented July 25, 1893.
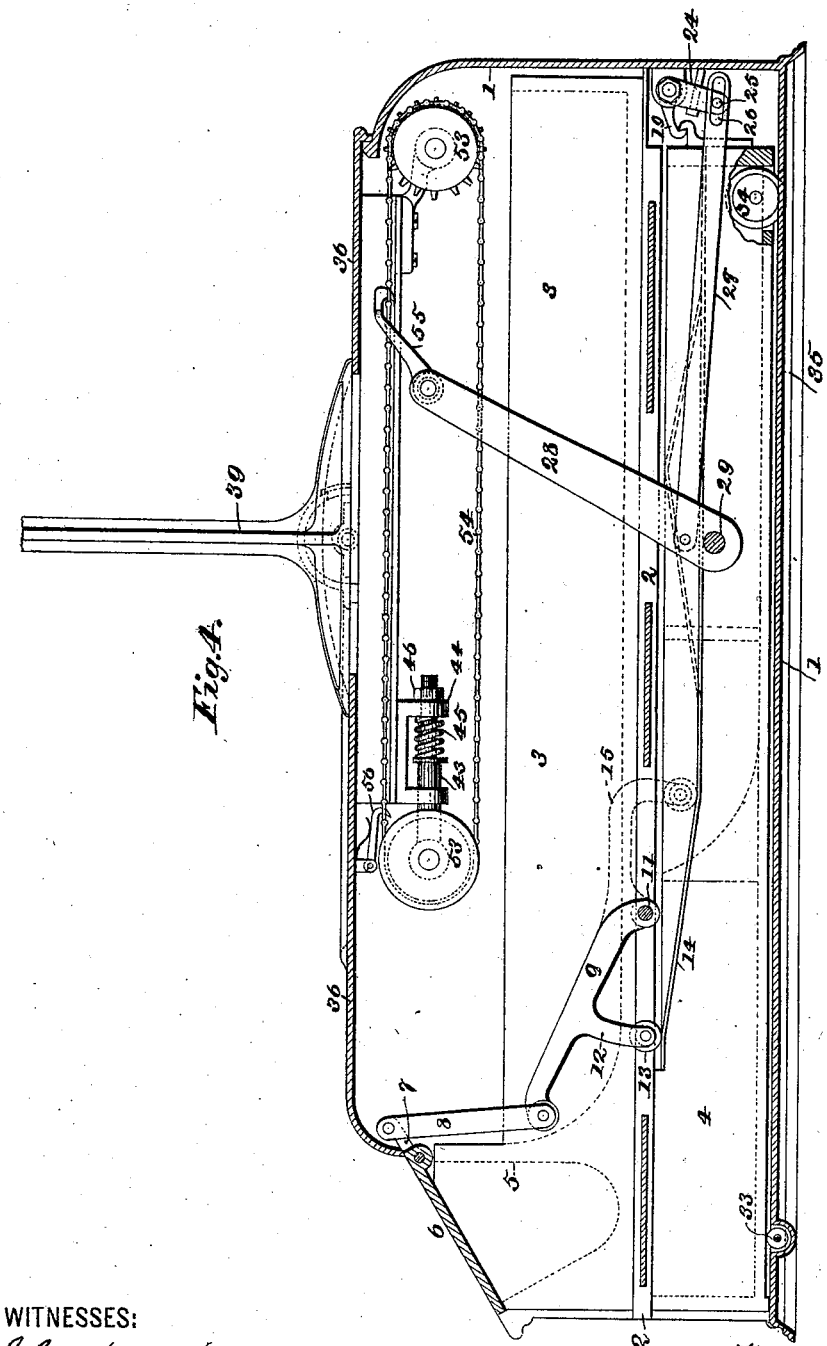
WITNESSES:
John Buckler,
Robt F. Gaylord
INVENTORS
Thurbur F. Russel
and James Brady
BY
Duncan & Page
ATTORNEYS

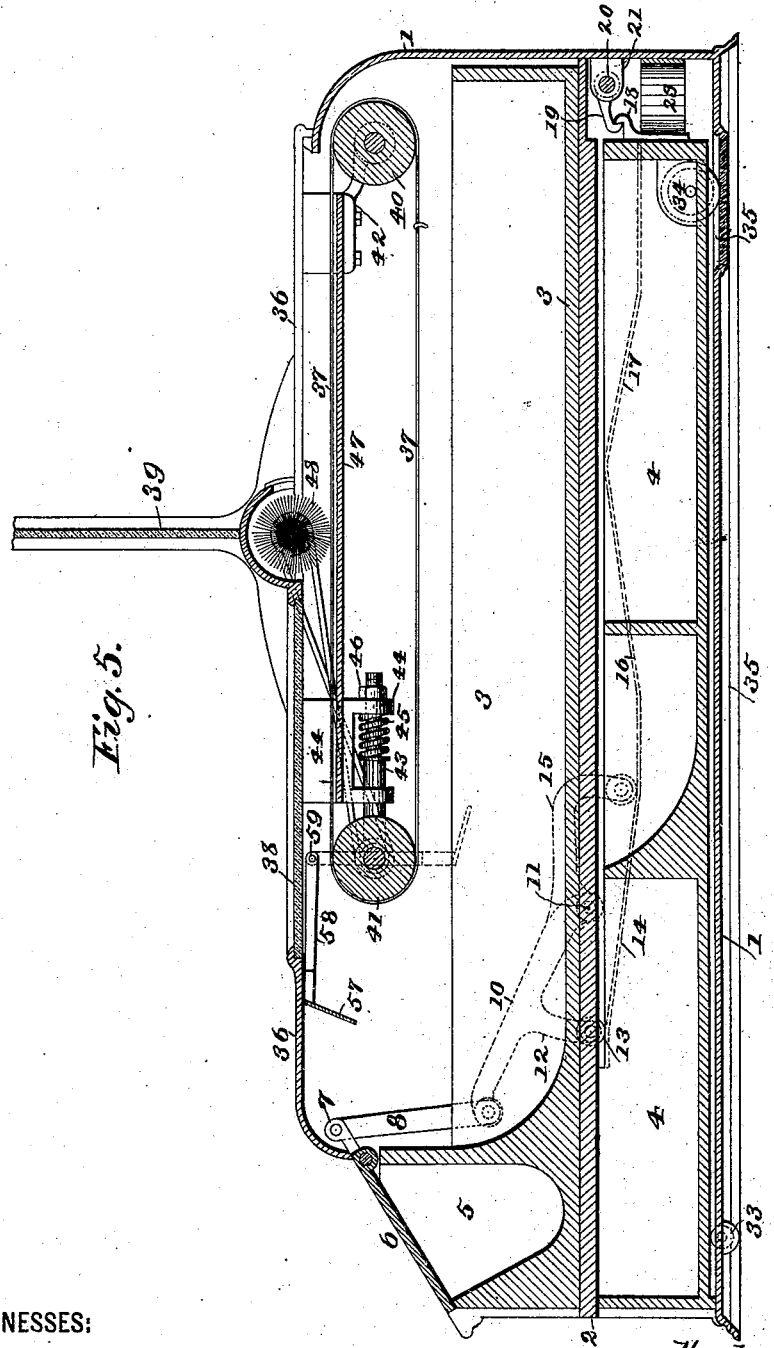

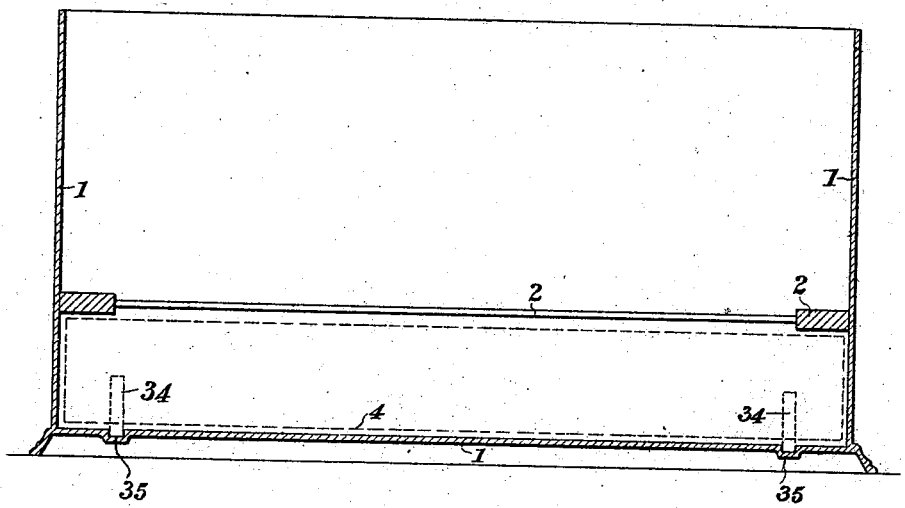

United States Patent Office.

THURBUR F. RUSSEL AND JAMES BRADY, OF BROOKLYN, NEW YORK, ASSIGNORS TO HOWARD GIBB, OF SAME PLACE.

CASH-CONTROLLING MACHINE.

SPECIFICATION forming part of Letters Patent No. 501,962, dated July 25, 1893.

Application filed October 5, 1892. Serial No. 447,942. (No model.)

*To all whom it may concern:*

Be it known that we, THURBUR F. RUSSEL and JAMES BRADY, citizens of the United States, residing in the city of Brooklyn, county of Kings, and State of New York, have invented a new and useful Improvement in Cash-Controlling Machines, of which the following is a specification, reference being made to the drawings accompanying and forming a part of the same.

The present invention relates to machines for controlling cash receipts, which machines are constructed and adapted to receive the money paid by a customer and control or hold the same in a locked compartment, the machine being also constructed in such manner that after the money, or the money and a check indicating the amount to be paid, have been received into the mechanism they are exposed to view, so that for a given time the amounts thereof can be readily ascertained, for the purpose, among other things, of making change.

The various features of invention herein described are applied to that class or form of cash controllers shown in the United States patent to Victor With, No. 453,824, of June 9, 1891, on which these features are improvements.

We will first describe the mechanism in detail, and then point out in the claims to follow the description the combinations of parts deemed to be new.

In the drawings accompanying this specification, Figure 1, is a plan view of the machine embodying our improvements, the vertical screen or guard set on top thereof being removed, portions of the upper covering or top parts being broken away to show the working parts below, and the drawers below (except for the broken-away rear end of the lower drawer) being withdrawn. Fig. 2 is an elevation of the same from the left-hand end of Fig. 1. Fig. 3, is a side view of the cash tray. Fig. 4 is a longitudinal vertical section just within the front vertical side walls of Fig. 1; that is, this section represents the parts as seen with one of the side walls removed and the sides of the cash drawers cut away. Fig. 5 is a vertical section taken centrally through the machine, a part of the base of the machine being also sectioned away laterally to expose the interior of one of the longitudinal grooves in the base. Fig. 6 is a vertical cross-section of the case of the machine, the top plate being removed, and the section being taken through the pivots of the wheels 34 of Fig. 4, the lower drawer in the case and its wheels 34 being indicated by dotted lines.

Referring to these views in detail, 1 represents the base and the walls of the casing of the machine, which in general construction are of a box-like form, being usually composed of thin cast metal plate sections secured together in any proper manner. This casing is divided by a horizontal partition 2 into an upper or receipts compartment and a lower or cash compartment, and these compartments contain the slide drawers 3 and 4, the fronts of which close the left-hand end of the machine, Figs. 1, 4 and 5, when they are in the casing as shown. The receipts drawer 3 is preferably without partition or dividing parts, except at its front end where it is provided with a row of coin pockets 5 extending across its end. The cash drawer 4 is variously partitioned in accordance with the shapes of bills, as also if desired, for coins. The receipts drawer is to be locked in position or otherwise secured in place in the casing so that the cashier cannot open it. The lower or cash drawer, as well as the coin pockets in the upper drawer can, however, be opened at the will of the cashier at any time, as for making change, &c.

6 is a lid covering and closing the coin pockets 5. It is suitably pivoted to the casing 1 and carries at each end the arms 7 projecting within the casing, to which arms are jointed the upper ends of the link bars 8, and these link bars are also pivotally connected to the outer ends of the levers 9 and 10, which levers are pivotally hung on rod 11 secured to the inner faces of the side casing. These levers carry cam arms 12 having friction wheels 13 at their lower ends, which bear upon the upper edges of the sides of the cash drawer 4. Each of these edges declines along the bevel portion 14, so that as the drawer is drawn out the wheels 13 will slide down these inclines, thus permitting the lid 6 to be raised to uncover the coin pockets 5; also, when the drawer is pushed in, the cam ends of the levers will be pushed upwardly, and the lid closed and held against being opened. To insure the opening of the lid 6, the lever 10 carries a second cam arm 15 (such arm not being on lever 9), and the edge of the drawer on this side is shaped to have a reverse or ascending bevel 16 and a second downward decline 17, while the edge of the other side of the drawer is horizontal from the foot of its decline 14. When the cash drawer is drawn out the cam arms 12 and 15 on the lever 10 are acted upon positively so that the lid 6 is opened and held so. Ordinarily the drawer will not be drawn out beyond a position corresponding to the desired raising of the lid. The second decline 17 is provided that the drawer may be entirely withdrawn, the lid closing gradually as the lever 10 is acted upon by the decline 17.

At the rear end of the cash drawer is a catch 18, which is designed to engage the rocking hook 19 mounted on shaft 20 hung in bracket 21 at the rear of the machine. This rod is under tension of the spring 22, which tends to hold hook 19 to position for engagement with the drawer catch 18.

23 is a leaf spring which bears against the rear end of the cash drawer, and acts to push the drawer out when the same is freed by raising catch hook 19. At the other end of shaft 20 and rigid therewith is the crank arm 24 the wrist pin 25 of which projects into the free slot 26 in the link 27, which link is pivoted to the upright hook arm 28 pivotally supported close to the inner face of the casing with its pivot 29 projecting through and rotarily mounted in the casing.

30 is the change tray, and is for passing change to a customer, serving also as a handle by which to operate the machine. This tray is pivotally mounted on two swinging arms 31 and 32, the former being pivoted at its lower end at 33 to the casing of the machine, and the latter being secured to the pivot 29 of the inner hook arm 28.

33 represents two front rolls upon which the drawer runs and 34 represents a pair of cushion tired wheels mounted on the drawer and running in longitudinal grooves 35 in the base plate of the machine. These provisions are to make the drawer run easily and without noise. It will now be seen that upon pulling the tray from its rear position, or from the rear of the machine to the front thereof, the hook catch holding the cash drawer will be raised and the drawer freed, whereupon the spring behind the same will project it toward the cashier. Conceiving that the tray has been returned to near the rear end of the machine, it will be understood that the drawer catch is in position to engage and hold the drawer when it is returned to closed position.

The top plate of the machine 36 is cut away so that a nearly square opening is made, directly beneath which appears the belt 37—to be described. It is also cut away at the front of the machine so as to form a similar opening or window place, in which and closing the same is secured the glass pane 38. The rear opening is the place where the customer deposits his money and check, that is, directly upon the belt 37.

The window opening is for the cashier to look through to see the amounts of money and check deposited when the same has been brought to under the window by the forward movement of the belt. Between these openings, a vertical shield 39, of glass, wire work or other transparent construction is erected. It is for the purpose of cutting off communication between customer and cashier, or to assist in insuring the deposit by the customer personally of the check and money representing the sale made and the cash in payment thereof. A short distance below these openings is located the belt 37, which is of any proper material, though preferably of some suitable fabric. This belt runs on rollers 40 and 41. The roll 40 is pivotally hung in brackets 42 fixed to the top plate 36, while the roll 41 is pivotally supported in the ends of the sliding rods 43, adjustably movable to keep the belt properly strained in the brackets 44 also secured to plate 36, springs 45 on these rods serving to give elastic action to them, and nuts 46 serving to limit their travel. Between the forward and rear set of brackets, and to them, is fixed the plate 47, which is to hold the belt in its plane of movement and against undue deflection; this plate also serves as a shield to prevent access to the receipts drawer through the opening in the top of the casing and above this plate.

48 is a spiral brush roll pivotally supported in bearings 49 on the top plate 36, Fig. 1, and covered by the base support of the screen 39. A pulley 50 on the axis of this brush is connected by an endless cord 51 with a pulley 52 on the axis of the belt roll 41, whereby movement of the belt or this roll causes the brush to rotate. Thus, as the belt 37 is caused to move toward the cashier, to bring the customer's deposit under the glass pane 38, this brush is rotated and engages the money and insures it being drawn along. Also this brush acts to spread out the money if bunched or wadded, and to separate the same from the check so that both can be easily scanned by the cashier. At the same time the brush closes vertically the opening between the belt 37 and the window 38.

The rolls that carry the belt 37 are each provided with a sprocket wheel 53, and an open link chain 54 connects these wheels so that the belt rolls are driven together. At the top end of rocking arm 28 is a hook 55 which is pivotally secured thereto, and turns to one side to overlie the chain 54, the point of the hook being so shaped and positioned as to readily drop into the chain links and engage them. A spring actuated dog 56, Fig. 4, pivoted to a lug on the top plate 36 is in the path of the chain and serves to engage the same and prevent the belt being moved backwardly, thus preventing a customer's deposit being passed out after it has once gone under the cashier's window. It will now be plain, that as the cash tray is moved toward the cashier at the front end of the machine, the belt chain will be engaged by the hook on the arm rigid with the axis of the tray-supporting parts, and the belt will be caused to move forward, the distributing brush revolved, and the cash drawer unfastened and pushed out; so that, assuming a customer's deposit has been made on the belt, this deposit will be brought under the cashier's window, and the amount ascertained, whereupon, if change be required from the money paid, the cashier puts the same in the cash tray, and pushes the tray to the rear end of the machine, that is, toward the customer who can then take the change from it. The cash drawer is then closed, and the machine is in condition for another deposit; the money check just deposited remaining in view, whereby errors may be detected and so corrected, until the next deposit is made. Upon receiving a second deposit, the first one is carried on and dropped into the receipts drawer, where it is retained until taken out by the custodian of the machine.

It is found that the collections in the receipts drawer pile up at the front end, and so are likely to clog and interfere with the action of the working parts, and accordingly we provide a push blade 57 (shown in part in Figs. 1 and 5) adapted to swing to under the roll 41 and carry forward the collections in its path. This blade is hung on side arms 58, which are pivoted by axes 59 in the sides of the casing. Springs 60 on these axes serve to keep the blade up against the upper plate of the casing as shown. On the right hand axis, and without the machine is a hand arm or lever 61, which being depressed causes the blade to descend and sweep forward the collections in front of it.

What is claimed as new is—

1. In combination in a cash controlling machine, a box or casing, an endless belt or carrier and mechanism for moving the same, a receptacle located under the belt, a glass pane projecting over part of the belt and a push plate 57, hung within the casing and adapted to swing to below the belt and thereby push the contents of the receptacle along or to other parts of the same.

2. In combination in a cash-controlling machine, a box or casing, an endless belt or carrier, a receptacle under said carrier, a glass pane projecting over part of the carrier, a roll brush 48 and mechanism for operating the same connected with and driven by the belt-driving mechanism.

3. In combination in a cash-controlling machine, a box or casing, an endless belt or carrier and mechanism for moving the same, a glass pane projecting over parts of the carrier, a drawer 3 located under the belt and provided with cash pockets 5 and cover 6, and mechanism connecting said cover with the driving mechanism of the belt and adapted to lift the said cover upon the forward movement of the belt.

4. In combination in a cash-controlling machine the endless belt and mechanism for driving the same the drawer and mechanism for locking said drawer which is connected with and operated to release the drawer by the operation of the belt driving mechanism.

5. In combination in a cash-controlling machine, the drawer 3 provided with cash pockets 5, the drawer 4, the cover 6 to said cash pockets and the lever and cam connections between the said cover and the beveled edges of said drawer 4, whereby as the said drawer is withdrawn and closed the cover 6 will be lifted and lowered to open and close the said pockets.

6. In combination in a cash-controlling machine, the endless belt and its driving mechanism, the drawer 4 and its locking mechanism, a spring 23 for impelling the drawer forward, and connections between the drawer locking mechanism and the belt-driving mechanism, whereby as the belt is moved forward the drawer will be released and also propelled forward.

7. In combination in a cash-controlling machine, the endless belt and its driving mechanism, the drawer 3 provided with pockets 5 and having a cover 6, the drawer 4 and its locking mechanism, connections between said cover and the drawer 4 whereby as the latter is propelled forward the cover will be raised, and mechanism connected with the belt-driving devices and adapted to release the drawer 4 as the belt is moved forward.

8. In combination with the endless belt and its driving mechanism, the drawer 4 and its locking mechanism and devices for operating the belt and releasing the drawer, which consists of the cash tray 30 mounted upon the lever arm 32, connected with and for working the said driving and releasing mechanisms.

THURBUR F. RUSSEL.
JAMES BRADY.

Witnesses as to signature of Thurbur F. Russel:
WILLIAM F. DUNDON,
CHARLES W. DONIGAN.

Witnesses as to signature of James Brady:
W. F. DUNDON,
GEO. RUSSELL.